US007532083B2

(12) United States Patent
Hannah

(10) Patent No.: US 7,532,083 B2

(45) Date of Patent: May 12, 2009

(54) ACTIVE NONLINEAR TRANSMISSION LINE

(75) Inventor: Eric C. Hannah, Pebble Beach, CA (US)

(73) Assignee: Intel Corporation, Santa Clara, CA (US)

( * ) Notice: Subject to any disclaimer, the term of this patent is extended or adjusted under 35 U.S.C. 154(b) by 300 days.

(21) Appl. No.: 11/389,620

(22) Filed: Mar. 23, 2006

(65) Prior Publication Data

US 2007/0222534 A1 Sep. 27, 2007

(51) Int. Cl.
*H04B 3/04* (2006.01)

(52) U.S. Cl. .......................................................... 333/20

(58) Field of Classification Search .................... 333/20
See application file for complete search history.

(56) References Cited

U.S. PATENT DOCUMENTS 3,173,026 A * 3/1965 Nagumo ..................... 327/570
4,855,696 A 8/1989 Tan et al.
5,023,574 A 6/1991 Anklam et al.
6,925,265 B2 8/2005 Franco et al.
6,943,935 B2 9/2005 Bickham et al.
6,943,936 B2 9/2005 Islam et al.
2006/0114550 A1 * 6/2006 Ricketts et al. .............. 359/330

FOREIGN PATENT DOCUMENTS

JP 2001-36476 A 2/2001

OTHER PUBLICATIONS

Thorpe, J.R.; Steenson, D.P.; Miles, R.E., "Harmonic generation using soliton effects on nonlinear transmission lines," High Frequency Postgraduate Student Colloquium, 1997, vol., No., pp. 87-92, Sep. 19, 1997.*

Eric W. Weisstein, "Soliton", from MathWorld—A Wolfram Web Resource, http://mathworld.wolfram.com/Soliton, html, Copyright 1999 CRC Press LLC, Copyright 1999-2005 Wolfram Research, Inc., printed Aug. 16, 2005, pp. 1-2.

Nanosys, "Nanotechnology A", http://www.nanosysinc.com/app/index.html, Copyright 2005-2005 Nanosys, Inc., printed Aug. 22, 2005, pp. 1-2.

Nanosys, "Core Nanosys Technology—What is Nanotechnology?", http://www.nanosysinc.com/tech/core.html, Copyright 2004-2005 Nanosys, Inc., printed Aug. 22, 2005, pp. 1-4.

Chris Eilbeck, "Department of Mathematics, Solitons Home Page", Heriot-Watt University Edinburgh, http://www.ma.hw.ac.uk/solitons/, Copyright 2001 Department of Mthematics, last modified: Oct. 27, 2004, printed Aug. 16, 2005, pp. 1-2.

Andrey E. Miroshnichenko et al.., "Solitons and Soliton Collisions", http://homepages.tversu.ru/~s000154/collision/main.html, printed on Aug. 16, 2005, pp. 3 total.

(Continued)

*Primary Examiner*—Benny Lee
*Assistant Examiner*—Gerald Stevens
(74) *Attorney, Agent, or Firm*—Blakely, Sokoloff, Taylor & Zafman LLP

(57) ABSTRACT

An apparatus for propagating a non-dispersive signals includes a transmission line with a voltage dependent propagation constant and distributed gain elements to maintain the non-dispersive signal between a maximum propagating amplitude and a minimum propagating amplitude.

17 Claims, 15 Drawing Sheets

OTHER PUBLICATIONS

Michael Y. Frankel et al., Student Member IEEE, "Terahertz Attenuation and Dispersion Characteristics of Coplanar Transmission Lines", IEEE Transactions on Microwave Theory and Techniques, vol. 39, No. 6, Jun. 1991, pp. 910-916.

Christophe Caloz et al., "Characteristics and Potential Applications of Nonlinear Left-Handed Transmission Lines", Microwave and Optical Technology Letters/vol. 40, No. 6, Mar. 20, 2004, pp. 471-473.

S.Y.R. Hui, et al., Senior Member, IEEE, "Modeling Non-Linear Power Electronic Circuits with the Transmission-Line Modeling Technique", IEEE Transactions on Power Electronics, vol. 10, No. 1, Jan. 1995, pp. 48-54.

Steffan Paul et al., "Models for Nonlinear Transmission Lines", Technical University Munich Institute for Network Theory and Circuit Design D-8000 Munich 2, Arcisstr. 21, Germany, Email: stpa@nws.e-technik.tu-muenchen.de, 0-7803-1254-6/93$03.00 Copyright 1993 IEEE, pp. 2287-2290.

T.C. Chai et al., "Wave-breaking on CMOS interconnect", Electronics Letters Aug. 1, 2002, vol. 38, No. 16, pp. 878-879.

Fernandez et al., "Analysis of the Formation and Interaction of Solitons in Nonlinear Transmission Lines by means of a Harmonic Balance Technique", CH2964-5/91/000-0627$01.00 Copyright 1991 IEEE, pp. 672-675.

J. Kunisch et al., "Determination of Stationary Traveling Waves on Nonlinear Transmission Lines", Department of Electrical Engineering and Sonderforschungsbereich 254, Duisburg University, Bismarckstr. 81, W-4100 Duisburg, FRG, 1993 IEEE MTT-S Digest, pp. 1037-1040.

I.V. Barashenkov et al., "Existence Threshold for the AC-Driven Damped Nonlinear Schrodinger Solitons", Department of Physics, University of Crete, P.O. Box 2208, 71003 Heraklion, Greece, arXiv:patt-sol/9906001 v1, May 28, 1999, pp. 1-4.

Miles M. Turner et al., "Methods of Theorectical Analysis and Computer Modeling of the Shaping of Electrical Pulses by Nonlinear Transmission Lines and Lumped-Element Delay Lines", IEEE Transactions on Electron Devices., vol. 38, No. 4, Apr. 1991, pp. 810-816.

Chris Eilbeck, "John Scott Russell and the Solitary Wave", Heriot-Watt University, Edinburgh-Department of Mathematics, http://www.ma.hw.ac.uk/~chris/scott_russell.html, last updated, Jan. 27, 2004, printed Aug. 16, 2005, pp. 1-3.

Klaus Brauer, "Welcome to Klaus Brauer's Soliton Page", USF Institute Studies, People News, http://www.usf.uni-osnabrueck.de/~kbrauer/solitons.html, Updated: Aug. 17, 2004, printed Aug. 16, 2005, pp. 1-2.

I. Molina-Fernandez et al., Student Member, IEEE, "Application of the Two-Dimensional Fourier Transform to Nonlinear Wave Propagation Phenomena", IEEE Transactions on Microwave Theory and Techniques, vol. 42, No. 6, Jun. 1994, pp. 1079-1085.

Wikipedia, The Free Encyclopedia, "Soliton", http://en.wikipedia.org/wiki/Soliton, last modified on Aug. 9, 2005, printed on Aug. 16, 2005, pp. 1-2.

Klaus Brauer, University of Osnabruck/Germany, "The Korteweg-de Vries Equation: History, exact Solutions, and graphical Representation", Departmetn of Mathematics & Computer Science, Applied Systems Science D-49069 Osnabruck, Germany, http://www.usf.uni-osnabrueck.de/~kbrauer, May 2000, revised Feb. 2004, pp. 1-16.

John Robert Burger, "Modeling Solitary Waves on Nonlinear Transmission Lines", IEEE Transactions of Circiuits and Systems-I: Fundamental Theory and Applications, vol. 42, No. 1, Jan. 1995, pp. 34-36.

Schottky Diode, "The Metal-Semiconductor Junction. Schottky Diode. OHMIC Contacts", http://www.mtmi.vu.lt/pfk/funkc_dariniai/diod/schottky.htm, Copyright 2002=Functional combinations in solid states-h.dr. V. Gavryushin, h.dr A.Zukauskas, Apr. 19, 2002, printed on Sep. 20, 2005, pp. 1-21.

M. Falah et al., "High Data Rate Pulse Regeneration Using Non-Linear Transmission Line Technology (NLTL)", o-7803-7118-6/01/$10.00Copyright 2001 IEEE, pp. 136-141.

Trong-Huang Lee et al., "A Novel Biased Anti-Parallel Schottky Diode Structure for Subharmonic Mixing", IEEE Microwave and Guided Wave Letters, vol. 4, No. 10, Oct. 1994, pp. 341-343.

Virginie Coda et al., "Wavelength, Power and Pulse Duration Influence on Spatial Soliton Formation in A1GaAs", Article in Press, Available online at www.sciencedirect.com, Optics Communications xxx (2005) xxx-xxx, www.elsevier.com/locate/optcom, Received Dec. 9, 2004, Received in revised form Feb. 21, 2005, Accepted Feb. 22, 2005, pp. 1-8.

M.E. Kowalski et al., "Karhunen-Loeve Based Model Order Reduction of Nonlinear Systems", Center for Computational Electromagnetics, Department of Electrical and Computer Engineering, University of Illinois at Urbana-Champaign, Urbana, IL 61801-2991,0-7803-7330-8/02$17.00Copyright 2002 IEEE, pp. 552-555.

PCT International Search Report for International Application No. PCT/US2007/064023, mailing date: Aug. 1, 2007, pp. 3 total.

* cited by examiner

ACTIVE NONLINEAR TRANSMISSION LINE

TECHNICAL FIELD

Embodiments of the present invention are related to digital signaling systems and, in particular, to high bandwidth digital signaling systems.

BACKGROUND

Conventional printed circuit (PC) boards used in high-speed digital systems (e.g., mother boards used for high-speed computers) consist of fiberglass-epoxy resin insulating layers supporting bonded and/or socketed integrated circuits (IC's) and have metallic traces (e.g., copper) that provide power, ground and signal lines. The speed of microprocessors and related computing chips has been increasing at an exponential rate, validating Moore's law, which predicts a doubling of data rates every 18 months.

It is predicted that in approximately five years, the speed demands on copper transmission lines on PCBs will reach their ultimate bandwidth limit of approximately 50 gigabits per second (Gb/s). This limit is imposed by the combination of signal attenuation and frequency dispersion. Even today, these effects are driving PC board designers away from bit-parallel, multi-drop busses towards bit-serial point-to-point connections. In addition, as signaling speeds increase, and operating voltage levels drop, conventional PC board transmission lines are becoming a major source of electromagnetic radiation and cross-talk, which limits the density (pitch) of interconnections and, ultimately, the number of gigabits of I/O per second per inch of chip periphery (Gb/sec/in).

The foregoing considerations are driving circuit and systems designers towards optical interconnects. However, optical interconnect systems may add a significant cost to the fabrication of a PC motherboard. Other, even more exotic approaches are being investigated, including photonic crystal waveguides and imbedded millimeter waveguides. However, these approaches are unproven and also likely to add significant costs.

BRIEF DESCRIPTION OF THE DRAWINGS

Embodiments of the invention are illustrated by way of example, and not by way of imitation, in the figures of the accompanying drawings and in which.

DETAILED DESRIPTION

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. The term "coupled" as used herein, may mean directly coupled or indirectly coupled through one or more intervening components or systems.

Methods and apparatus for active nonlinear transmission lines are described. In one embodiment, an apparatus includes a nonlinear transmission line configured to propagate a non-dispersive pulse having a non-propagating lower amplitude threshold and a pulse-splitting upper amplitude threshold, and a number of pulse amplifiers coupled with the nonlinear transmission line, where the pulse amplifiers amplify a signal having an amplitude above the lower amplitude threshold and attenuate a signal having an amplitude below the lower amplitude threshold.

Figure 1:
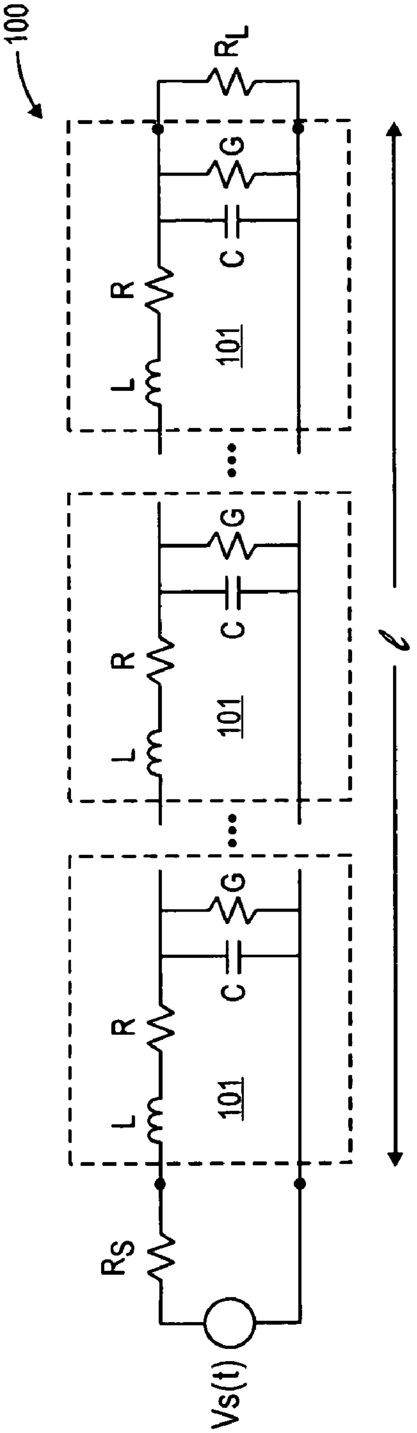
FIG. 1 illustrates a lumped element approximation of a two-conductor transmission line.
Figure 3A:
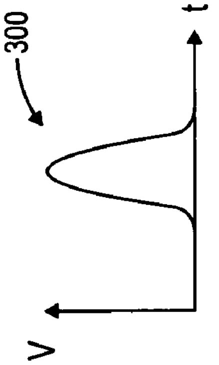
FIGS. 3A-3D illustrate dispersion and attenuation of a pulse propagating on a conventional transmission line.
Figure 3B:
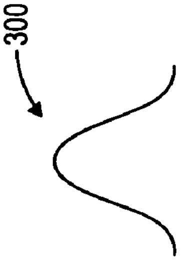
Figure 3C:
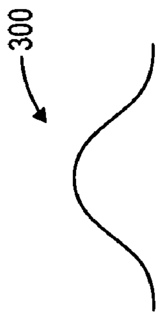
Figure 3D:

A printed circuit (PC) board trace and its associated return conductor (e.g., a parallel trace, a ground plane or the like) may be modeled as a two conductor transmission line. Transmission lines are distributed structures that may be described in terms of reactive and resistive parameters per unit length, which determine the characteristic impedance and propagation constant of the transmission line, and the propagation velocity of electromagnetic energy traveling on the transmission line. FIG. 1 illustrates a lumped element approximation of a two-conductor transmission line 100 connected between a signal source $v_s(t)$ (e.g. a line driver), with a source impedance $R_S$, and a termination (e.g., a line receiver) with load impedance $R_L$. In FIG. 1, L is the series inductance per unit length (e.g., nanohenries per inch), R is the series resistance per unit length (e.g., milliohms per inch), C is the shunt capacitance per unit length (e.g., picofarads per inch) and G is the shunt conductance per unit length (e.g., millimhos per inch). The model can be made arbitrarily accurate for any given length of transmission line l, by modeling n line sections 101, where each section represents a line segment of length l/n and n is arbitrarily large. The series inductance is proportional to the effective permeability of the dielectric media surrounding the conductors. The shunt capacitance is proportional to the effective permittivity of the dielectric media. The series resistance arises from the resistivity of the conductors and from skin affect losses at high frequencies. The shunt conductance arises from losses in the dielectric media. In the following descriptions of embodiments of the invention, it will be assumed for clarity that the transmission lines are uniform transmission lines, such that all the L's are equal, all the C's are equal, all the R's are equal, and all the G's are equal. Those skilled in the art will recognize that embodiments of the present invention may also be practiced using non-uniform transmission lines.

The characteristic impedance of the transmission line of FIG. 1 is given by, $$Z_0 = \sqrt{\frac{R + j\omega L}{G + j\omega C}} \tag{1}$$

where $j=\sqrt{-1}$ and $\omega$ is the radian frequency ($2\pi f$) of the signal on the line. For low loss transmission lines, where R<<L and G<<C, the characteristic impedance may be approximated by, $$Z_0 \approx \sqrt{\frac{L}{C}} \text{ ohms.} \tag{2}$$

The propagation constant of the transmission line is given by, $$\gamma = [(R + j\omega L)(G + j\omega C)]^{\frac{1}{2}} \tag{3}$$

which may be approximated for low loss transmission lines by, $$\beta \approx \omega\sqrt{LC} \tag{4}$$

in radians per unit length. The velocity of propagation is given by, $$v_p = \frac{d\omega}{d\beta} = \frac{1}{\sqrt{LC}} \tag{5}$$

If L and C are frequency independent, then all the frequency components of a signal on the transmission line will propagate with the same velocity. For example, a narrow pulse (which may contain a wide range of frequencies) will propagate without distortion. However, if L and C are frequency dependent, different frequency components will propagate at different velocities and a narrow pulse will spread out (disperse) as it propagates along the transmission line. This latter situation exists for non-uniform and/or unbalanced transmission lines that do not support pure TEM (transverse electromagnetic) wave propagation, such as the microstrip transmission lines and coplanar waveguide (CPW) transmission lines that are ubiquitous in high speed printed circuit boards.

Figure 2B:
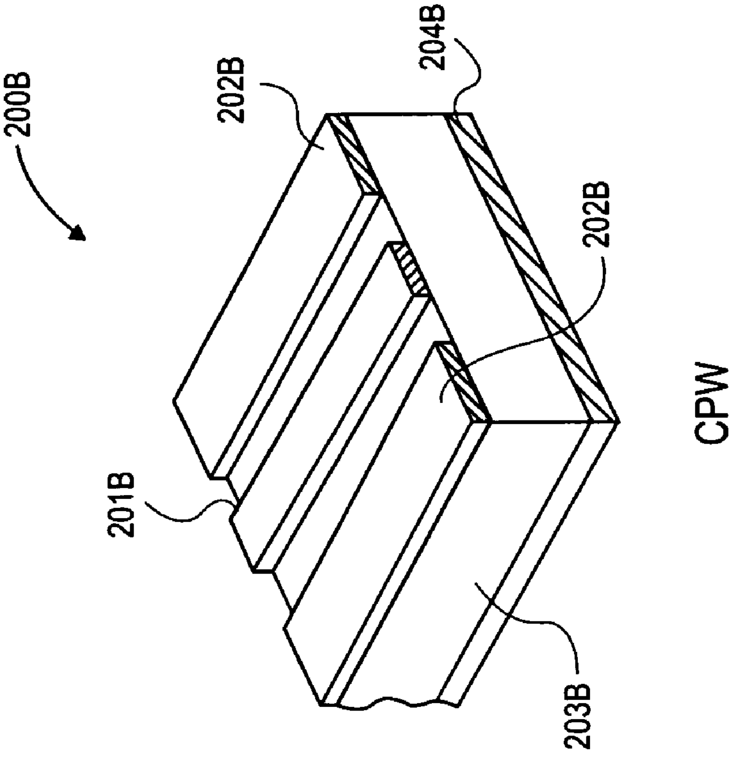
FIG. 2B illustrates a coplanar waveguide transmission line in one embodiment.
Figure 2A:
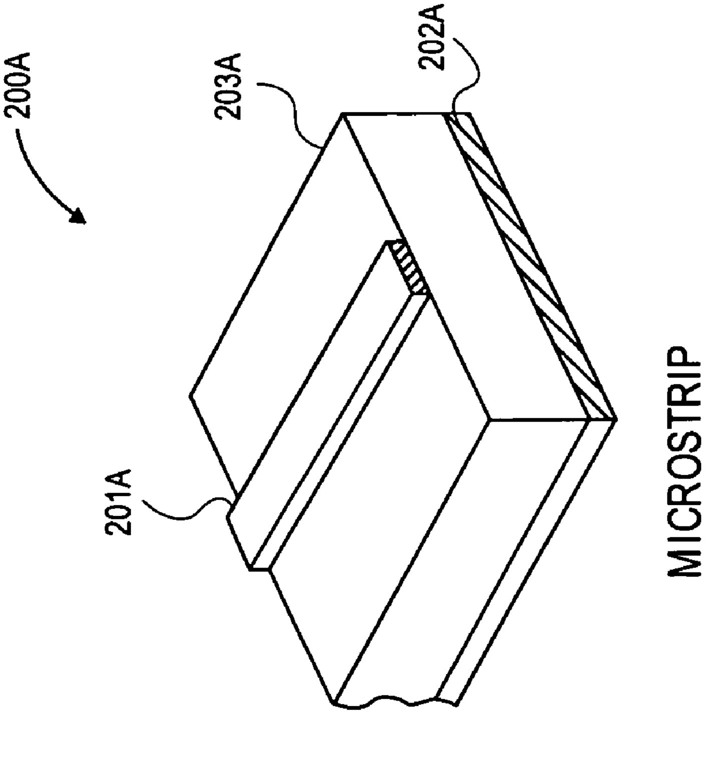
FIG. 2A illustrates a microstrip transmission line in one embodiment.

As illustrated in FIGS. 2A and 2B, respectively, microstrip transmission line 200A and CPW transmission line 200B geometries are unbalanced conductor geometries, and/or mixed dielectric structures. In FIG. 2A, microstrip 200A includes a signal line 201A and a ground plane 202A, separated by an insulating dielectric (e.g., epoxy-fiberglass) 203A. In FIG. 2B, CPW 200B includes a signal line 201B and ground planes 202B, both printed or deposited on one side of insulating dielectric 203B. Such configurations have electromagnetic (EM) fields with longitudinal electric and/or magnetic field components that are frequency dependent. A frequency dependent magnetic field results in a frequency dependent inductance per unit length (L), and a frequency dependent electric field results in a frequency dependent capacitance per unit length. Therefore, these common PC board transmission line configurations are dispersive.

FIGS. 3A through 3D illustrate the effects of dispersion and attenuation on a pulse 300 as it travels down a dispersive transmission line, such as transmission line 100. The high frequency components of pulse 300 propagate at a lower velocity than the low frequency components of pulse 300, causing the pulse energy to spread and lose amplitude. The attenuation is also frequency dependent, causing further distortion and amplitude loss. The dispersion and attenuation have at least two negative effects. First, the timing of edge detection becomes difficult because the slopes of the leading and trailing edges of the pulse decrease. Second, the pulse may not have enough amplitude to trigger a detection circuit at all.

One approach to this problem is to use voltage-dependent capacitances between the signal line and the ground plane to modulate the capacitance of the transmission line per unit length (changing the effective dielectric constant of the transmission line) with the voltage of the propagating pulse. It has been shown that the proper choice of the initial pulse shape (e.g., pulse 300 in FIG. 3A) and the capacitance versus voltage characteristic of the voltage-dependent capacitances can compensate for the natural frequency dispersion of a transmission line (see, e.g., J. Kunish and I. Wolf, "Determination of Stationary Traveling Waves on Nonlinear Transmission Lines," *IEEE MTT-S Digest*, pp 1037-1040, 1993). The resulting pulse is known as a soliton.

A soliton is a self-reinforcing solitary wave caused by nonlinear effects in the transmission medium. Solitons are found in many physical phenomena, as they arise as the solutions of a widespread class of weakly nonlinear partial differential equations describing physical systems. Solitons have interesting properties. Below a lower amplitude threshold, the soliton becomes evanescent and dies out. Above an upper amplitude threshold, the soliton splits into two solitons. Between the non-propagating lower amplitude threshold and the pulse-splitting upper amplitude threshold, the soliton propagates without frequency dispersion, but subject to attenuation due to skin-effect and dielectric losses as described above. A pair of solitons may propagate in opposite directions in a transmission medium without interfering with one another as long the brief superposition of the two solitons does not create a pulse with an amplitude above the upper amplitude threshold.

Figure 4:
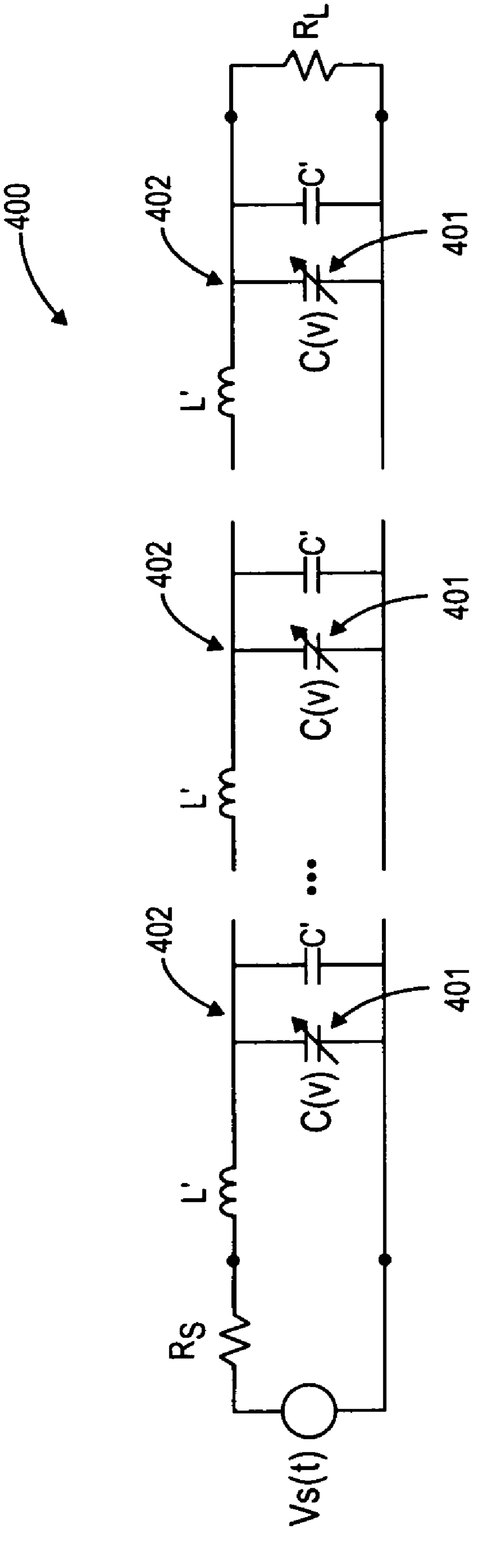
FIG. 4 illustrates a passive nonlinear transmission line model.

FIG. 4 illustrates a passive, nonlinear transmission line model 400 where the lossy elements R and G have been omitted for clarity. In FIG. 4, voltage-dependent capacitances 401 are connected in parallel with the capacitances C. In FIG. 4, capacitances 401 may each be a voltage-dependent capacitance C(v), where v is the instantaneous voltage at each corresponding node 402 as a pulse (e.g., pulse 300) travels along the transmission line 400. In FIG. 4, the total shunt capacitance per unit length will be C(v)+C (the parallel combination of C(v) and C). A non-dispersive transmission line may be realized if each C(v) is related to the voltage v at its corresponding node 402 by a function such as, $$C(v) = \frac{C_0}{\left(1 + \frac{v}{V_b}\right)^m} \tag{6}$$

where $C_0$ is the capacitance when voltage v is zero, $V_b$ is a voltage parameter and m is a sensitivity parameter. The capacitance versus voltage function of equation 6 may be approximated by a diode, for example. A low barrier Schottky diode, for example, may have a barrier voltage $V_b$=0.3 volts and a sensitivity parameter m=½. Other diode types may also approximate the behavior of equation 6, such as graded-junction or abrupt-junction PN junction diodes, varactor diodes, for example, with different values of $V_b$ and m.

In order to compensate for the dispersion characteristics of the transmission line 400, the voltage-dependent capacitance 401 per unit length should provide enough capacitance variation to compensate for the dispersion over a frequency range of interest. It has been shown that over a range of frequencies from 10 GHz to 1000 GHz, the intrinsic capacitance per unit length, C, varies on the order of approximately 10% (see, e.g., Michael Y. Frankel, et al., "Terahertz Attenuation and Dispersion Characteristics of Coplanar Transmission Lines," *IEEE Trans. on Microwave Theory and Techniques*, vol. 39, no. 6, June 1991). Therefore, the variation in the capacitance available from the voltage-dependent capacitance per unit length ($\Delta C(v)$) should be on the order of approximately 10% of the intrinsic capacitance per unit length C. The value of C will be determined by the dimensions of the transmission line and the dielectric constant of the dielectric medium.

Figure 5A:
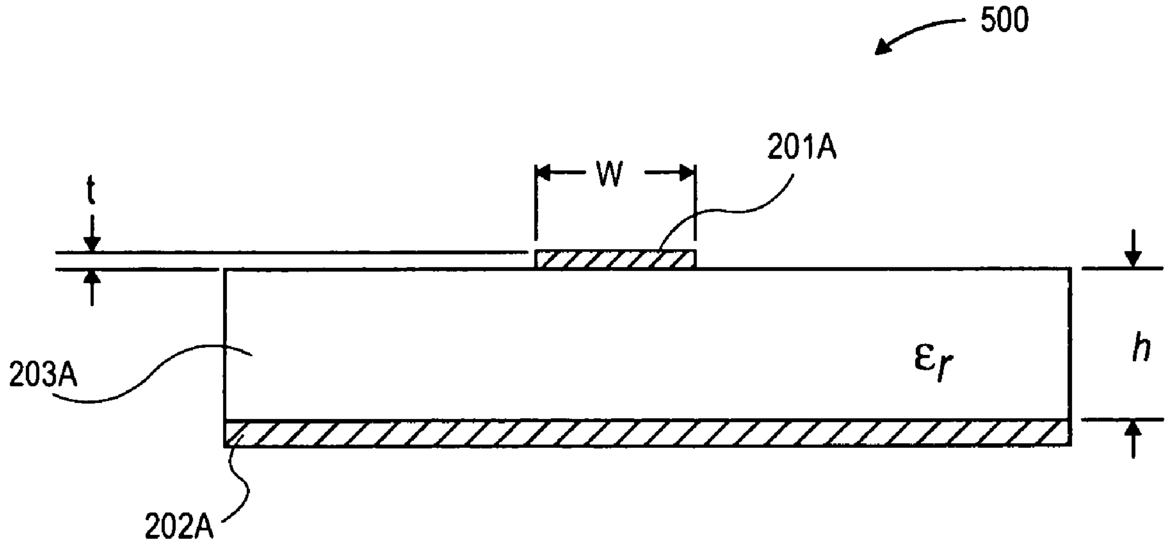
FIG. 5A illustrates a cross-sectional view of a microstrip transmission line.
Figure 5B:
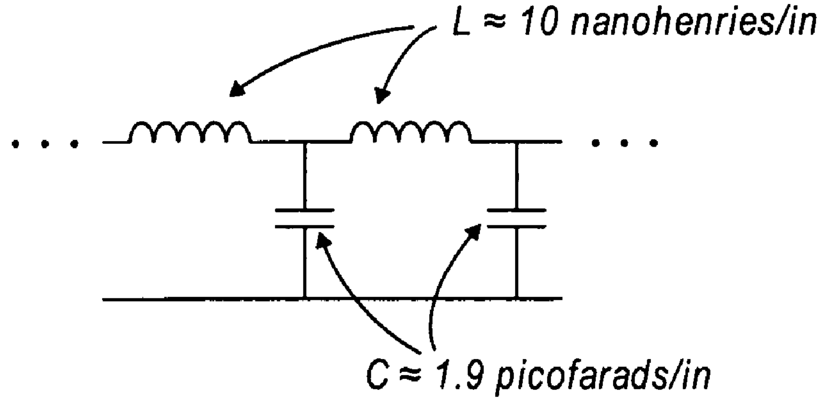
FIG. 5B illustrates an equivalent circuit for the microstrip transmission line of FIG. 5A in one embodiment.

FIG. 5A illustrates a cross-sectional view 500 of the microstrip transmission line structure 200A of FIG. 2A. In FIG. 5A, w is the width of trace 201A, t is the thickness of trace 201A, h is the height of the dielectric layer 203A separating trace 201A and ground plane 201A and $\in_R$ is the relative dielectric constant of dielectric layer 203A. In one exemplary embodiment, w may be 5 mils (1 mil=1/1000 inch), t may be 0.5 mils, h may be 5 mils and $\in_R$ may be 4.2 (e.g., the relative dielectric constant of FR4 epoxy-fiberglass). Using techniques known in the art, the characteristic impedance $Z_0$, the propagation delay $\tau$, the inductance per unit length L, and the capacitance per unit length C for this exemplary transmission line my be calculated as $Z_0 \approx 72$ ohms, $\tau \approx 138$ picoseconds (psec) per inch, $L \approx 10$ nanohenries (nH) per inch and $C \approx 1.9$ picofarads (pF) per inch, as illustrated in FIG. 5B.

Figure 6:
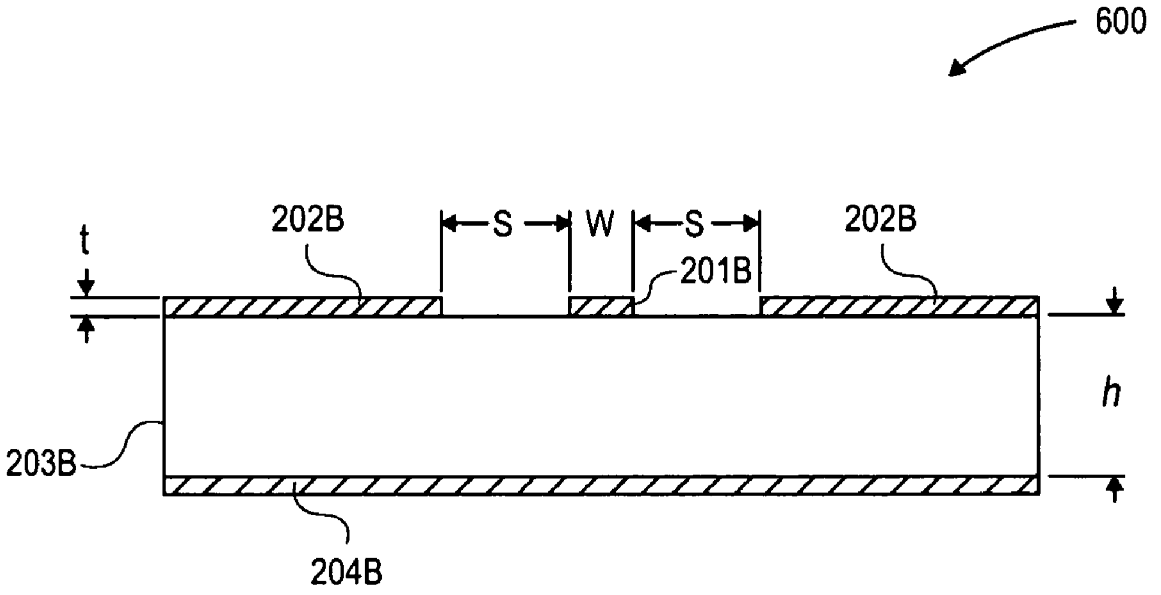
FIG. 6 illustrates a cross-sectional view of a coplanar waveguide transmission line.

FIG. 6 illustrates a cross-sectional view 600 of the coplanar waveguide transmission line structure 200B of FIG. 2B. In FIG. 6, w is the width of trace 201B, t is the thickness of trace 201B, h is the height of the dielectric layer 203B separating trace 201B and ground plane 204B, s is the spacing between trace 201B and coplanar ground planes 202B, and $\in_R$ is the relative dielectric constant of dielectric layer 203B. A coplanar waveguide transmission line may be designed to have the same electrical characteristics (i.e., same characteristic impedance, propagation delay, and inductance and capacitance per unit length) as the exemplary microstrip line 500, above. For example, a coplanar waveguide line with the dimensions w=5 mil, t=0.5 mil, h=15 mils and s=2 mils, and $\in_R$=4.2 as above would have $Z_0 \approx 72$ ohms, $\tau \approx 138$ psec per inch, $L \approx 10$ nH per inch and $C \approx 1.9$ pF per inch. It will be appreciated by those skilled in the art that these dimensions may be scaled up or down while maintaining approximately the same electrical characteristics.

As noted above, in order for the capacitances C(v) to compensate for the dispersion characteristics of a transmission line, such as transmission lines 500 and 600, with the physical characteristics described above, the value of $\Delta C(v)$ should be approximately ten percent of the intrinsic capacitance per unit length C. With respect to the exemplary transmission lines described above, that percentage would translate to approximately 0.2 pF/inch. Equation (6) above can be used to calculate a corresponding zero-voltage capacitance $C_0$.

$$\frac{C_0}{\left(1 + \frac{v}{V_b}\right)^m} = 0.2 \text{ pf/in} \tag{7}$$

For the Schottky barrier diode described above, with $V_b$=0.3 volts and m=½, $C_0$ may be calculated from:

$$0.2 = C_0 - C(v) = Co\left[1 - \frac{1}{\left(1 + \frac{v}{0.3}\right)^{\frac{1}{2}}}\right] \text{pf/inch.} \tag{8}$$

A propagating pulse in a high speed digital system may have a peak pulse voltage of v 1.5 volts, for example, in which case:

$$C_0 \approx 0.34 \text{ pf/inch.} \tag{9}$$

The total zero-voltage capacitance per unit length would then be $C_0 + C \approx 2.24$ pf/inch. With the additional capacitance, the exemplary transmission line geometries above would have approximately the following characteristics: $Z_0 \approx 66$ ohms and $\tau \approx 150$ psec/inch.

Figure 7:
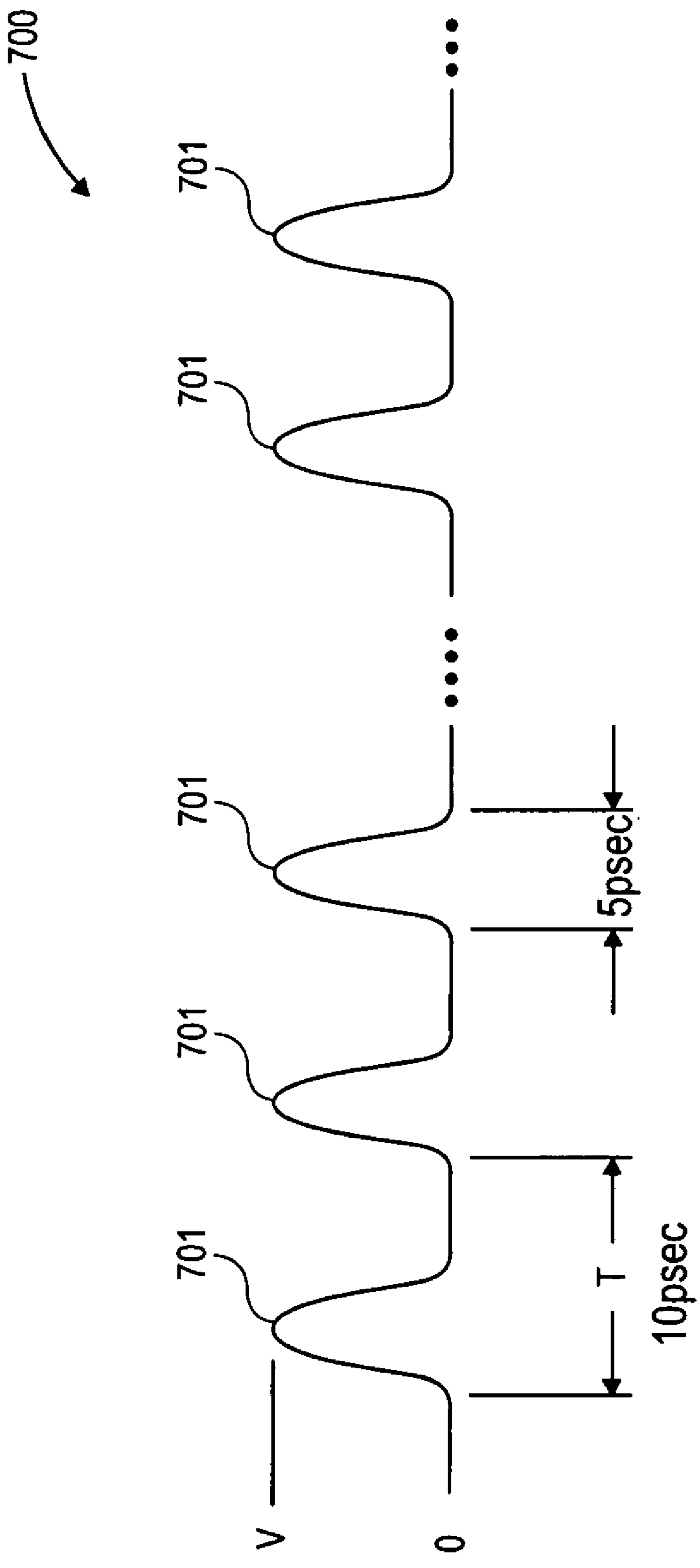
FIG. 7 illustrates a high data rate pulse train in one embodiment.

FIG. 7 illustrates an example of a high data rate pulse train 700. Pulse train 700 may be a 100 GHz (100 Gbit/sec) clock signal, for example, with a 10 psec interval T between clock pulses 701 and a peak pulse voltage of 1.5 volts. For clarity of exposition, clock pulses 701 are assumed to be raised cosine pulses with a period of 5 psec. As noted above, C is a distributed (i.e., continuous) transmission line capacitance, while each $C_0$ may be a discrete capacitance (such as a diode, for example). A value of $C_0$ and a physical distribution of voltage-dependent capacitances may be selected to approximate a distributed (i.e., continuous) capacitance. A discrete distribution of elements (such as capacitances 401) may appear continuous to an incident signal, such as signal 700, if the distance (critical spacing) between adjacent elements is approximately equal to or less than one-tenth of a wavelength of the highest frequency component of the signal. By definition, the wavelength of the cosine pulse 701 is its duration multiplied by its propagation velocity ($1/\tau$). In this exemplary embodiment, the wavelength would be (5 psec)×(0.0067 inches/psec), or approximately 0.033 inches. Therefore, in order to approximate a continuous distribution of capacitance with discrete capacitances, discrete capacitance could be located at approximately 3 mil (or less) intervals along the transmission line. To achieve a $C_0$=0.34 pf/inch, for example, a discrete capacitances of approximately 0.03 pf could be located at 3 mil intervals. Alternatively, discrete capacitances of 0.01 pf could be located at 1 mil intervals, for example.

Figure 8:
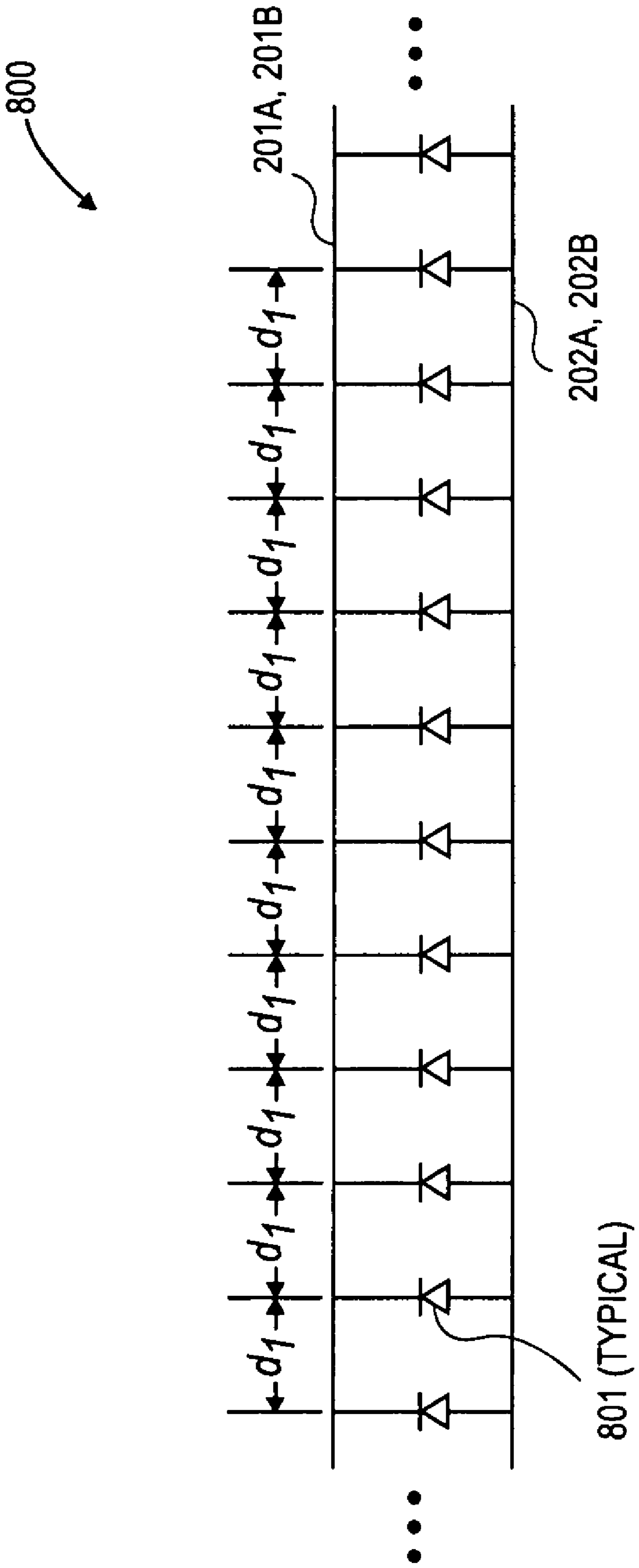
FIG. 8 illustrates a distribution of diodes on a transmission line in one embodiment.

FIG. 8 illustrates a distribution of diodes along a transmission line. In FIG. 8, transmission line 800 may represent either of transmission lines 500 or 600, with diodes 801 (typical) connected between the trace (201A or 201B) and ground plane(s) (202A or 202B) at regular intervals $d_1$ (e.g., at 3 mil intervals). The distributed capacitance C and distributed inductance L are omitted from FIG. 8 for clarity. Diodes 801 may be selected to have a desired zero-voltage capacitance $C_0$ (e.g., 0.03 pF) and a capacitance-voltage characteristic that satisfies equation (6), as described above. Diodes 801 may be mounted as illustrated in FIG. 8 with cathodes connecting to the signal carrying trace (201A or 201B) and their anodes connected to the ground plane (202A or 202B). It will be appreciated that in this configuration, the diodes will be reverse biased by the voltage of a positive-going signal, and that such a signal will propagate without dispersion as described above. Alternatively, diodes 801 may be physically reversed (swapping anode and cathode connections) such that a negative-going signal will propagate on the line without dispersion.

Figure 9:
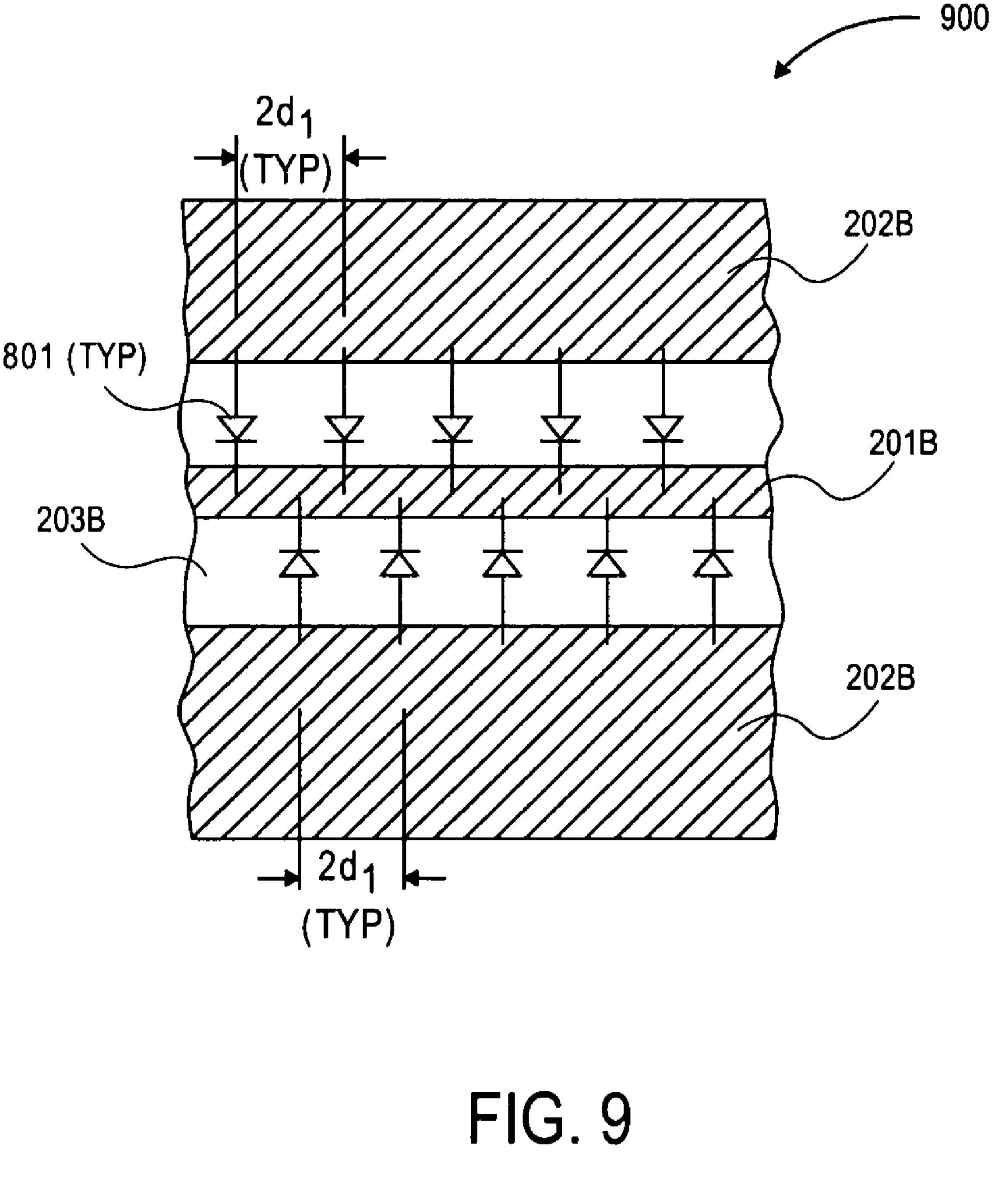
FIG. 9 illustrates a nonlinear coplanar waveguide transmission line in one embodiment.

FIG. 9 illustrates one embodiment of a nonlinear coplanar waveguide transmission line with a distribution of diodes as described above. As illustrated in FIG. 9, the diodes 801 may be alternated on either side of trace 201B such that the average spacing on each side of the trace is $2d_1$ and the overall average spacing is $d_1$.

Figure 10A:
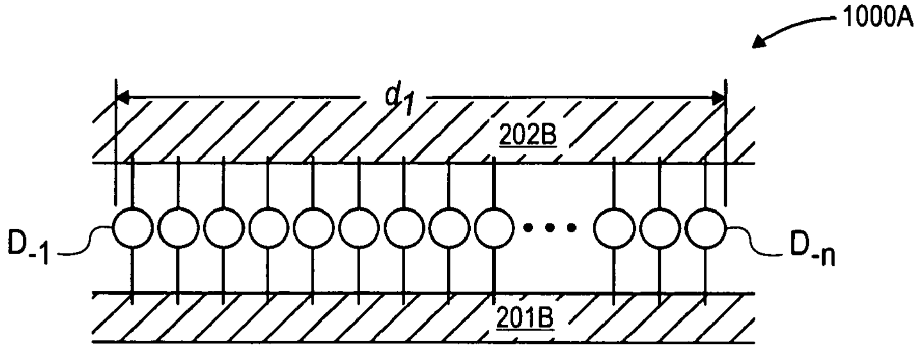
FIGS. 10A-10C illustrate planar arrays of diodes in several embodiments.
Figure 10B:
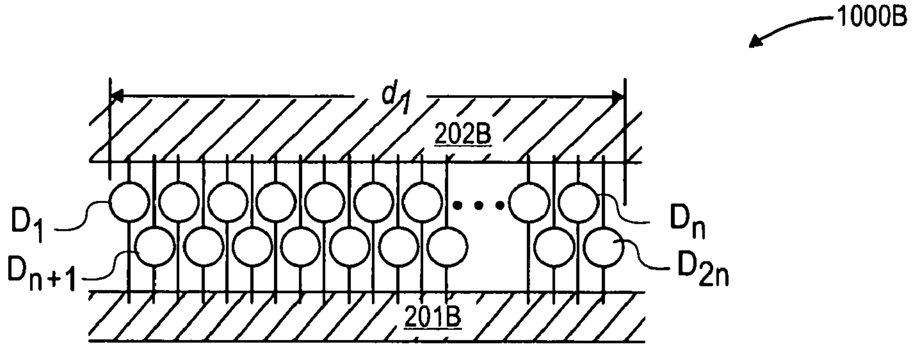
Figure 10C:
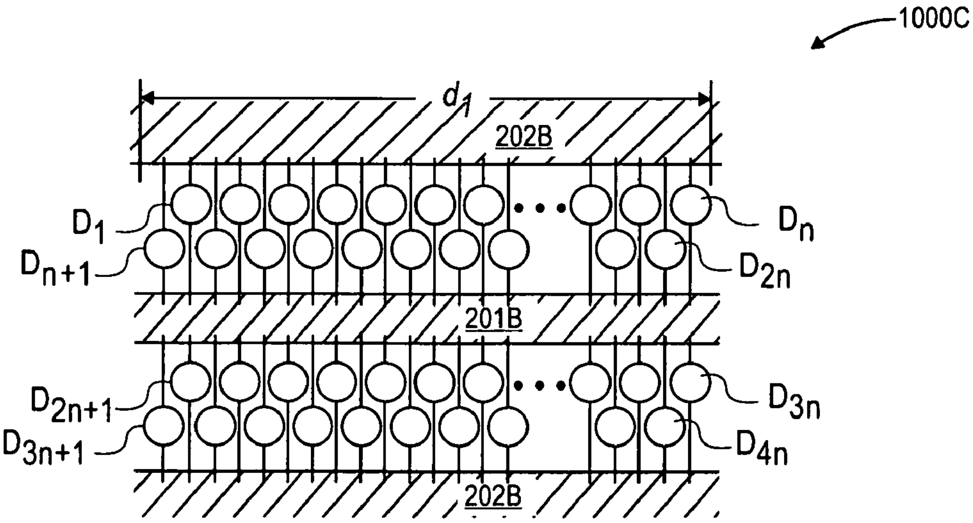

The spacing $d_1$ may be limited only by the capacitance density (capacitance per unit area and/or per unit volume) of the diodes. Take, for example, one embodiment using gallium arsenide (GaAs) low-barrier Schottky barrier diodes. Gallium arsenide has a relative dielectric constant of approximately 11.5, which translates to a permittivity $\epsilon_s \approx 1.018$ Farad/meter (0.0026 pF/mil). The zero-bias capacitance of a GaAs Schottky barrier diode is then given by $C_{j0} = A\epsilon_s / w_{d0}$, where A is the junction area of the diode and $w_{d0}$ is the zero-bias depletion layer width of the diode. The depletion later width is given approximately by:

$$w_{d0} \approx \left[ (V_b) \frac{(2\varepsilon_s)}{qN_d} \right]^{\frac{1}{2}} \quad (10)$$

where $V_b$ is the barrier voltage, q is the electron charge, and $N_d$ is the doping density. Using typical values of $V_b = 0.3$ volts, $q = 1.602 \times 10^{-19}$ coulomb, and $N_d = 10^{17}/\text{cm}^3$, yields $w_{d0} = 1.95 \times 10^{-9}$ meters, or $7.68 \times 10^{-5}$ mils. Therefore, the zero bias capacitance will be approximately 33.7 pF per square mil of junction area. A capacitance distribution of 0.03 pF, used in the example above, would thus require a junction area of $10^{-3}$ square mils, or a circular junction diameter of approximately 0.035 mils (0.86 microns). Thus, it would be possible to place one diode every 3 mils without interference. A closely packed planar array of diodes, such as the planar array 1000A illustrated in FIG. 10A, could support approximately n=28 diodes per mil. Other packing arrangements may result in even greater diode densities. For example, the closely packed planar array 1000B illustrated in FIG. 10B allows for 2n diodes in the same linear distance $d_1$. FIG. 10C illustrates a packing arrangement 1000C that may be used with the coplanar waveguide transmission line 200*b*, for example, where 4n diodes may be packed into the linear distance $d_1$. It will be appreciated that the number of diodes that can be packed into a planar array, such as planar arrays 1000A-1000C will be inversely proportional to the diameter of the individual diodes.

Figure 11:
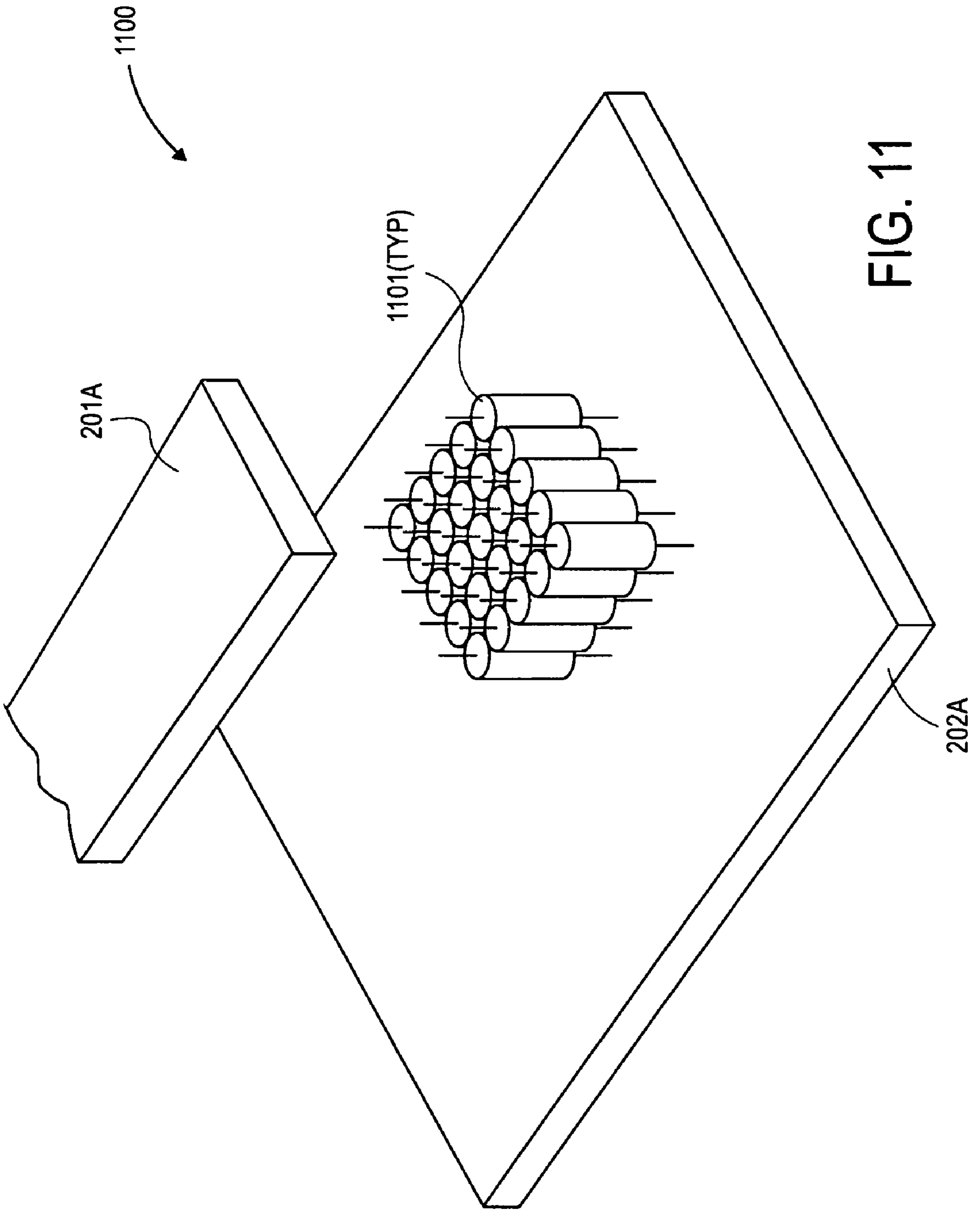
FIG. 11 illustrates a volume array of diodes in one embodiment.

FIG. 11 illustrates a volume array 1100 of axial diodes 1101 as they may be packed between the trace 201A and ground plane 202A of microstrip transmission line 200A, for example, embedded in dielectric 203B (not shown). It will be appreciated that the number of diodes that can be packed into a volume array, such as volume array 1100, will be inversely proportional to the square of the diameter of the individual diodes. Higher density packing configurations, as illustrated for example in FIGS. 10A-10C and FIG. 11, may be used to achieve higher net capacitances per unit length. Alternative, as described in greater detail below, higher density packing configurations may be used to achieve a target capacitance per unit length when some known or estimated percentage of diodes are defective and or not connected to the transmission line.

Figure 12:
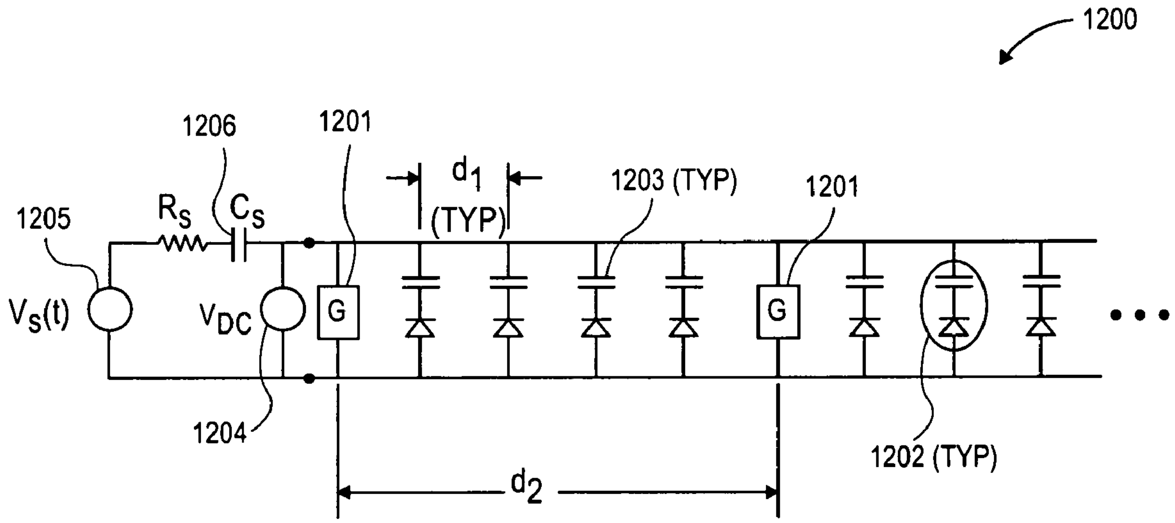
FIG. 12 illustrates an active nonlinear transmission line in one embodiment.

As described above, the nonlinear transmission lines may exhibit non-dispersive propagation. However, any real transmission line will exhibit attenuation due to dielectric losses and resistive losses, and any real diode will add additional dielectric and/or resistive losses. Therefore, a soliton propagating on a non-dispersive transmission line will eventually be attenuated to its non-propagating threshold, and die out. If the soliton can be periodically amplified, however, it may be sustained indefinitely. FIG. 12 illustrates an active nonlinear transmission line 1200 with pulse amplifiers 1201 spaced approximately periodically at a distance $d_2$ within an array of diodes 1202 spaced approximately periodically at a distance $d_1$, which may be the critical distance required for the simulation of a distributed nonlinear capacitance as described above. Distance $d_2$ may be a second critical distance related to the rate of signal attenuation on the transmission line 1200 and the gain of the pulse amplifiers 1201, as described below. Diodes 1202 may each include a DC blocking capacitor 1203. Methods of fabricating integrated diodes and capacitors are known in the art and, accordingly, art not described in detail. Pulse amplifiers 1201 may be powered by a DC voltage supply 1204, which may be isolated from signal source 1205 by blocking capacitor 1206 and isolated from diodes 1202 by blocking capacitors 1203.

As noted above, solitons exhibit a non-propagating lower amplitude threshold and a pulse-splitting upper amplitude threshold. Pulse amplifiers 1201 may include sense amplifiers configured to sense propagating pulses, to amplify pulse voltages that are above the lower amplitude threshold, and to attenuate and/or not amplify pulse voltages that are below the lower amplitude threshold. Pulse amplifiers 1201 may also be limiting amplifiers and/or automatic gain control (AGC) amplifiers which are configured to output amplified pulse amplitudes at or just below the pulse-splitting upper amplitude threshold. Pulse amplifiers 1201 may be, for example tunnel diode amplifiers or any other type of negative resistance amplifier such as Gunn diode or impatt diode amplifiers, for example. Pulse amplifiers 1201 may also be any type of distributed amplifier configured to receive a signal at one point along the transmission line and to inject an amplified version of the signal at another point along the transmission line with a phase that reinforces the propagating signal.

Figure 13:
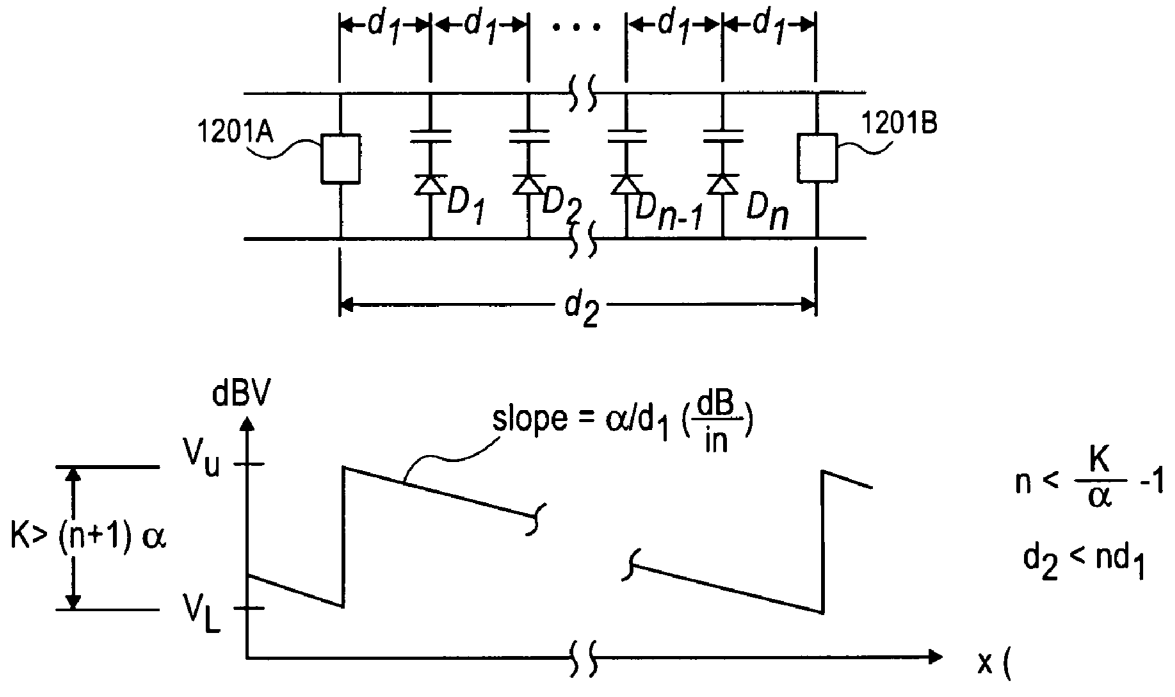
FIG. 13 illustrates critical distances between active elements in an active nonlinear transmission line in one embodiment.

FIG. 13 illustrates the relationship between critical distance $d_1$ and critical distance $d_2$. As noted above, amplifiers 1201*a* and 1201*b* may be configured to amplify soliton pulses with peak amplitudes that are at or above the lower amplitude threshold $V_l$ and output pulses that are at or below the pulse-splitting upper amplitude threshold $V_u$. The difference between $V_u$ and $V_l$ may be k dB (decibels), for example. If there are n diodes $D_1$ through $D_n$ between pulse amplifier 1201*a* and pulse amplifier 1201*b*, and the attenuation constant of the transmission line 1200 is a $\alpha/d_1$ dB per unit length, then to prevent a pulse from dropping below the lower amplitude threshold, n should be less than $(k/\alpha)-1$, and $d_2$ should be less than or equal to $(n+1)d_1$. Thus, in one embodiment, the ratio $d_2/d_1$ should be less than or equal to $k/\alpha$.

Active nonlinear transmission lines (ANTs), such as transmission line 1200 described above, may be closely spaced without being susceptible to the cross-coupling (cross-talk) associated with conventional transmission lines. If the energy coupled from one ANT to another ANT produces a coupled voltage which is below the non-propagating lower amplitude threshold, the coupled energy will not propagate. Additionally, systems utilizing ANTs such as those described herein will be more tolerant of terminal mismatches for the same reason. Below a certain level of terminal impedance mismatch, reflected energy will not propagate on the ANT because the reflected voltage will be below the non-propagating lower amplitude threshold.

In one embodiment, pulse amplifiers (such as pulse amplifiers 1201, for example) and diodes (such as diodes 801, 1101 and 1202) described above, may be implemented as discrete semiconductor chips, millimeter scale raw die, flip chips, beam lead devices or any other form suited for surface mounting and/or embedding in transmission line structures such as transmission line structures 500 and 600. In one embodiment, the pulse amplifiers and diodes may be fabricated as nanostructures and dispersed in a dielectric medium that may be applied to or injected into a transmission line structure. For example, pulse amplifiers 1201 and diodes 1202 may be fabricated as quantum dots (QD's) such as those manufactured by Nanosys, Incorporated of California. Quantum dots are low defect molecular structures grown in high temperature furnaces. Molecular scale amplifier and diode quantum dots may be joined with wire arrays (e.g., tetrahedral arrays) to form "spiny dots," (e.g., two terminal devices with two wire leads at each terminal) which may be randomly distributed in an epoxy filler (or other filler material suitable for a PCB), to form a QD-epoxy filler, which may be applied to a linear transmission line structure and cured to produce an active nonlinear transmission line (ANT) such as transmission line 1200.

Figure 14A:
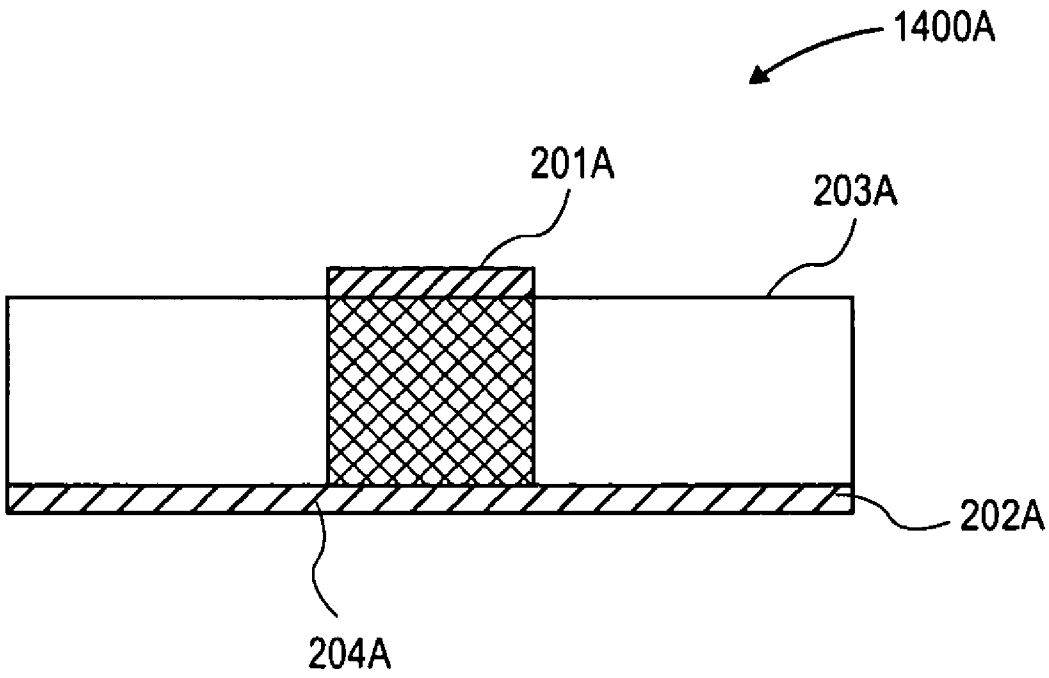
FIG. 14A illustrates one embodiment of an active nonlinear transmission line.
Figure 14B:
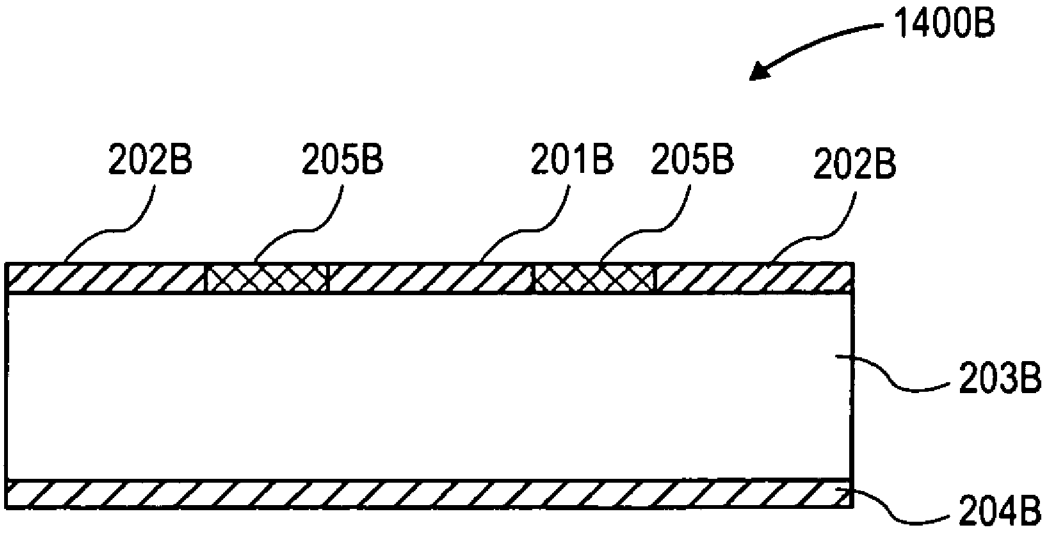
FIG. 14B illustrates another embodiment of an active nonlinear transmission line.

FIG. 14A illustrates how a QD-epoxy filler may used to manufacture an ANT 1400A, based on the structure of microstrip transmission line 200A. In FIG. 14A, a QD-epoxy filler 204A fills the space between ground plane 204A and trace 201A. FIG. 14B illustrates how a QD-epoxy filler 205B may be used to manufacture an ANT 1400B, based on the structure of coplanar waveguide 200B. In FIG. 14B, a QD-epoxy filler fills gaps between trace 201B and ground planes 202B.

Because the nanostructures can be fabricated to such a small scale, the number of devices per unit length within the QD-epoxy filler may be much larger than the number required to yield the ANT performance described above. However, the devices may be randomly distributed within the filler material, so that only a limited percentage of devices are functionally connected between the transmission line conductors (such as conductors 201B and 202B, for example). Assuming a uniform random distribution of quantum dots, the statistics of large numbers may be used to determine the density of QD devices required in the epoxy filler to achieve a net number of functional interconnects which satisfy the ANT parameters. Additionally, the ratio of diodes (such as diodes 1202) to pulse amplifiers (such as pulse amplifiers 1201) in the QD-epoxy filler may be selected based on the ratio $d_2/d_1$ described above.

Figure 15:
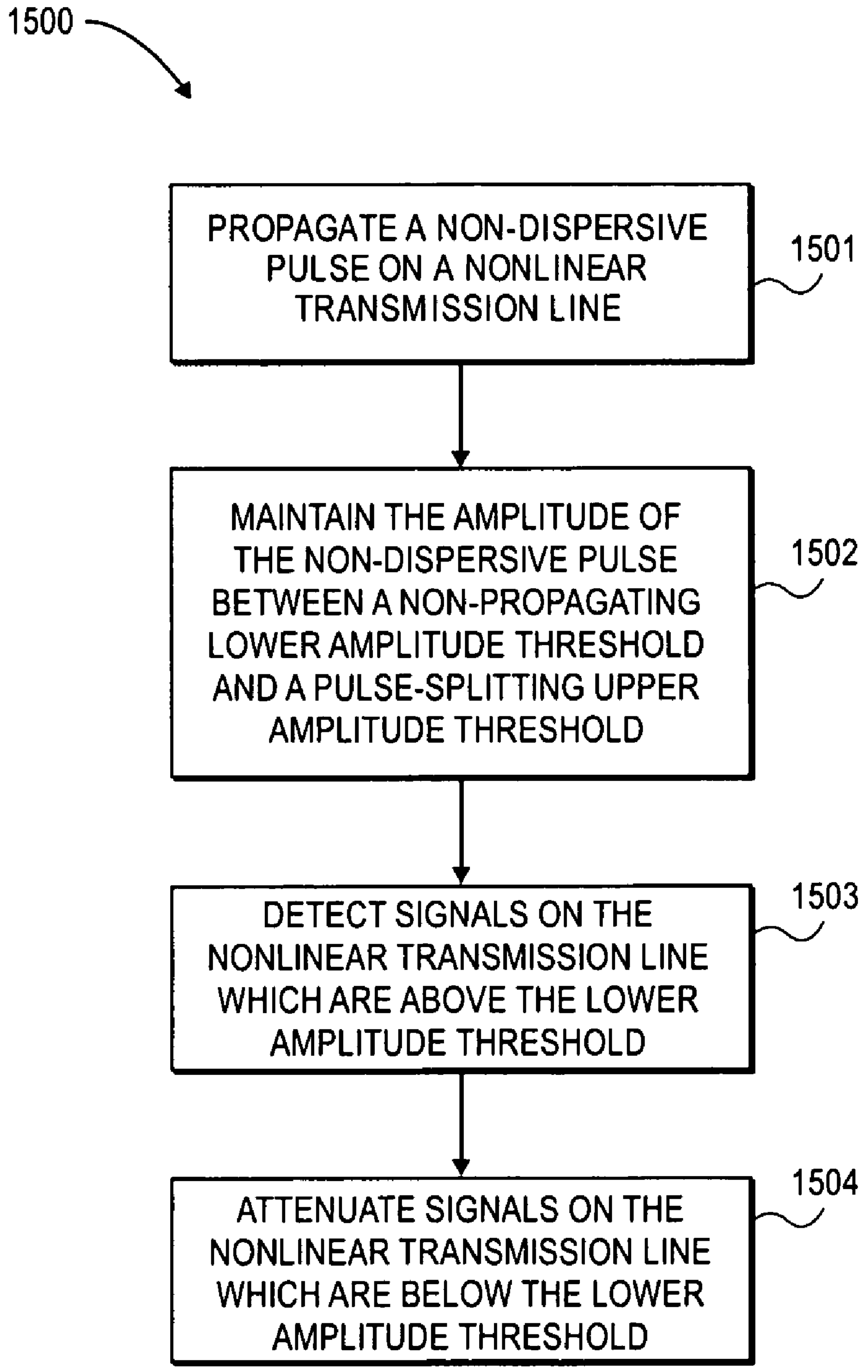
FIG. 15 is a flowchart illustrating a method in one embodiment.

Thus, in one embodiment as illustrated in FIG. 15, a method 1500 includes propagating a non-dispersive pulse on a nonlinear transmission line (step 1501), and maintaining the amplitude of the non-dispersive pulse between a non-propagating lower amplitude threshold and a pulse-splitting upper amplitude threshold (step 1502). In other embodiments, the method 1500 may also include detecting signals on the nonlinear transmission line which are above the lower amplitude threshold (step 1503), and attenuating signals on the nonlinear transmission line which are below the lower amplitude threshold (step 1504).

Figure 16:
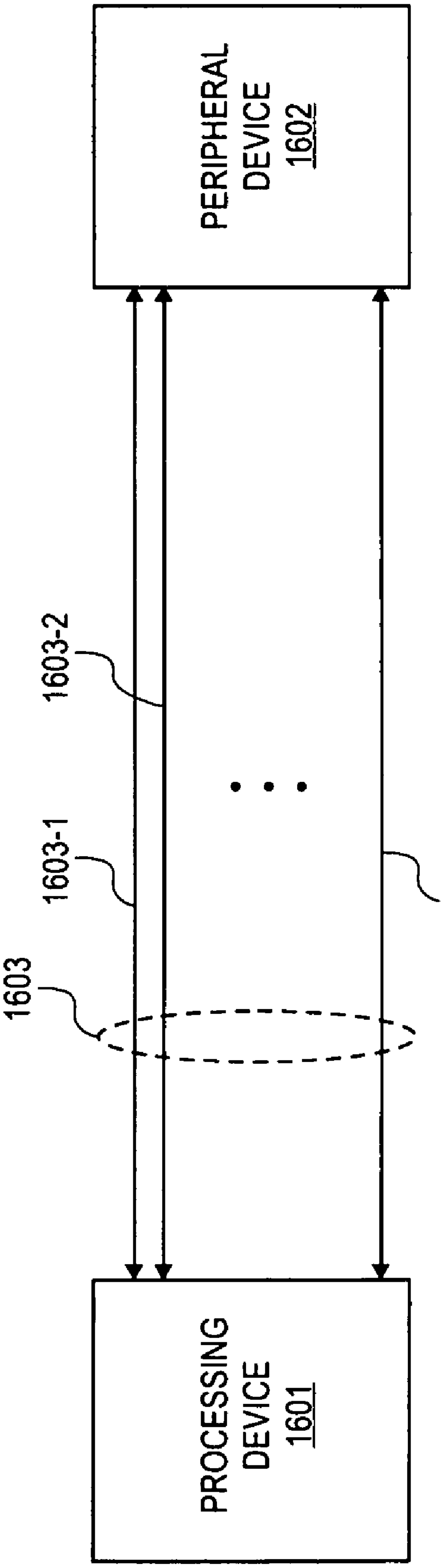
FIG. 16 illustrates a system incorporating active nonlinear transmission lines in one embodiment.

FIG. 16 illustrates a system incorporating active nonlinear transmission lines in one embodiment. In FIG. 16, a processing device 1601 is coupled with a peripheral device 1602 with an active nonlinear bus 1603, which includes active nonlinear transmission lines 1603-1 through **1603-*n* (e.g., multiple instances of active nonlinear transmission line 1200 described above). Processing device 1601 may be any type of general purpose processing device (e.g., a microprocessor, microcontroller or the like) or special purpose processing device (e.g., an application specific integrated circuit, a field programmable gate array, a digital signal processor or the like). Peripheral device 1602** may include any type of memory device, memory management device, storage device, interface device or peripheral processing device.

In one embodiment, the active nonlinear transmission lines 1603-1 through **1603-*n* may be configured to propagate non-dispersive pulses between the lower non-propagating threshold and the upper pulse splitting threshold as described above, and the processing device 1601 and the peripheral device 1602 may be configured to send and receive pulses which are between the lower non-propagating threshold and the upper pulse-splitting threshold, wherein the active non-linear bus may support simplex communications between the processing device 1601 and the peripheral device 1602**.

In one embodiment, pulse amplifiers in the active nonlinear transmission lines 1603-1 through **1603-*n* (such as pulse amplifiers 1201 in active nonlinear transmission line 1200, for example) may be configured to limit the amplitude of non-dispersive pulses to one-half of the upper pulse splitting threshold, and the processing device 1601 and the peripheral device 1602 may be configured to send and receive pulses which are between the lower non-propagating threshold and one-half the upper pulse-splitting threshold, wherein the active non-linear bus may support full duplex communications between the processing device 1601 and the peripheral device 1602**.

It should be appreciated that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. An apparatus, comprising:

a nonlinear transmission line configured to propagate a non-dispersive pulse having a non-propagating lower amplitude threshold and a pulse-splitting upper amplitude threshold, wherein the nonlinear transmission line comprises:

a pair of conductors comprising a first conductor and a second conductor;

a dielectric medium disposed between the pair of conductors; and a plurality of voltage-variable capacitors having voltage dependent capacitances, wherein the voltage-variable capacitors are coupled between the first conductor and the second conductor along a length of the pair of conductors, and wherein a spacing between voltage-variable capacitors along the length of the pair of conductors is less than or equal to a first critical spacing; and a plurality of pulse amplifiers coupled with the nonlinear transmission line, wherein the pulse amplifiers are configured to amplify a signal having an amplitude above the lower amplitude threshold and to attenuate a signal having an amplitude below the lower amplitude threshold.

2. The apparatus of claim 1, wherein the non-dispersive pulse comprises a maximum frequency component having a propagation wavelength in the dielectric medium, wherein the first critical spacing is approximately one-tenth of the propagation wavelength.

3. The apparatus of claim 1, wherein the non-dispersive pulse comprises a voltage profile, and wherein the voltage-dependent capacitances are controlled by the voltage profile of the non-dispersive pulse.

4. The apparatus of claim 1, wherein the plurality of voltage dependent capacitors are disposed within the dielectric medium.

5. The apparatus of claim 1, wherein the plurality of pulse amplifiers is coupled between the first conductor and the second conductor along the length of the pair of conductors, and wherein a spacing between pulse amplifiers along the length of the pair of conductors is less than or equal to a second critical spacing.

6. The apparatus of claim 5, wherein each of the plurality of pulse amplifiers is configured to limit the voltage profile of the non-dispersive pulse to the upper amplitude threshold, wherein the nonlinear transmission line attenuates the non-dispersive pulse as it propagates, and wherein the second critical spacing is a distance required to attenuate the non-dispersive pulse from the upper amplitude threshold to the lower amplitude threshold.

7. The apparatus of claim 1, wherein the plurality of pulse amplifiers is disposed within the dielectric medium.

8. The apparatus of claim 1, wherein the plurality of voltage-variable capacitors comprises a first plurality of nanostructures randomly distributed within the dielectric medium.

9. The apparatus of claim 8, wherein the plurality of pulse amplifiers comprises a second plurality of nanostructures randomly distributed within the dielectric medium.

10. The apparatus of claim 9, wherein a ratio between the first plurality of nanostructures and the second plurality of nanostructures is approximately equal to a ratio between the second critical spacing and the first critical spacing.

11. The apparatus of claim 1, wherein the plurality of pulse amplifiers comprises a plurality of negative resistance amplifiers.

12. The apparatus of claim 11, wherein the plurality of negative resistance amplifiers comprises a plurality of tunnel diode amplifiers.

13. The apparatus of claim 1, wherein the plurality of pulse amplifiers comprises a plurality of distributed amplifiers.

14. The apparatus of claim 1, wherein the plurality of voltage-variable capacitors comprises a plurality of variable capacitance diodes.

15. The apparatus of claim 14, wherein the plurality of variable capacitance diodes comprises a plurality of Schottky barrier diodes.

16. The apparatus of claim 1, wherein the first conductor and the second conductor are planar conductors comprising a microstrip transmission line.

17. The apparatus of claim 1, wherein the first conductor and the second conductor are planar conductors comprising a coplanar stripline transmission line.

* * * * *